May 1, 1951  J. FERRIERA  2,550,793
SUPPORT OR STAND
Filed March 26, 1948  2 Sheets-Sheet 1
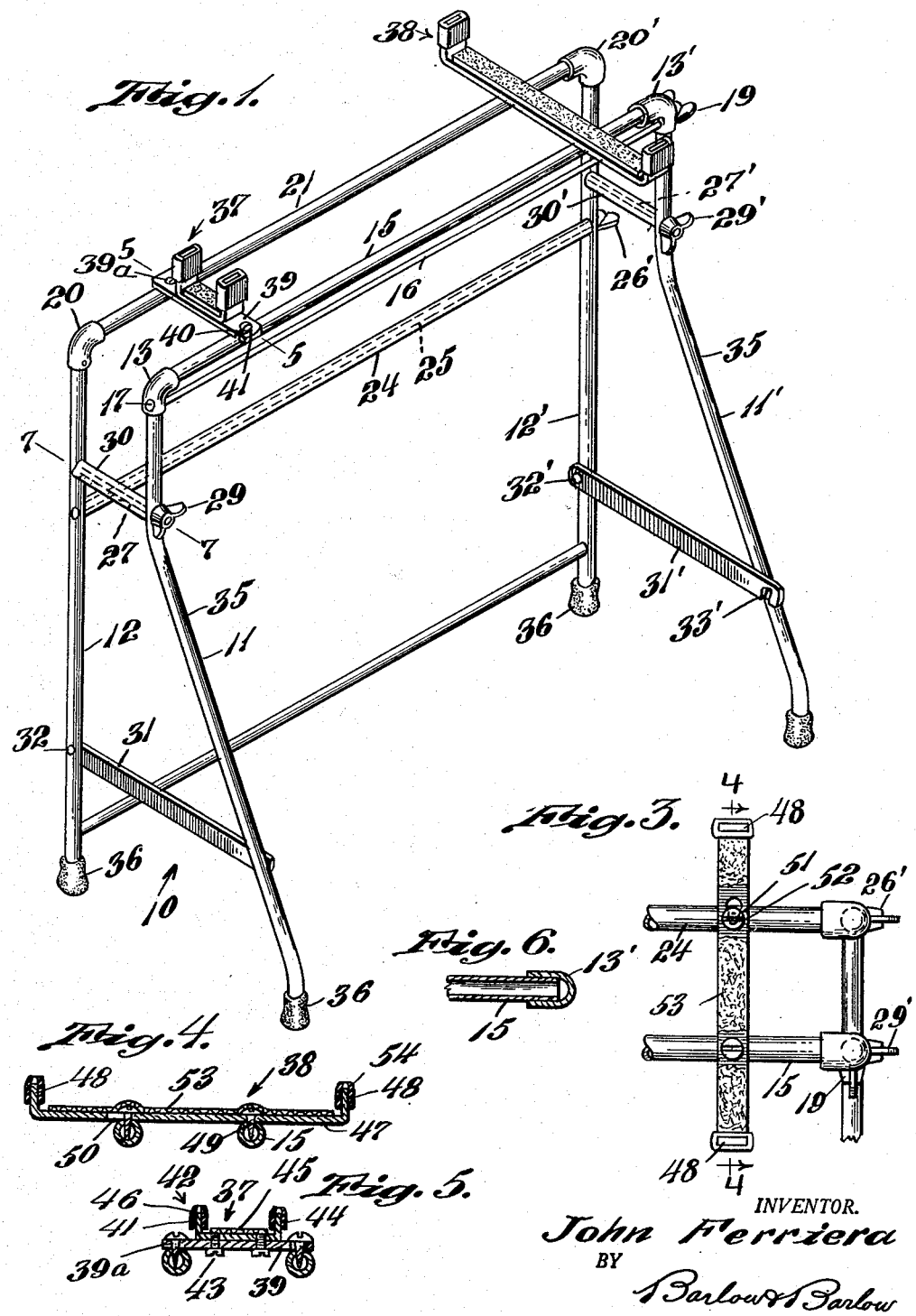
INVENTOR.
John Ferriera
BY
Barlow & Barlow
ATTORNEYS.

May 1, 1951 J. FERRIERA 2,550,793
SUPPORT OR STAND
Filed March 26, 1948 2 Sheets-Sheet 2
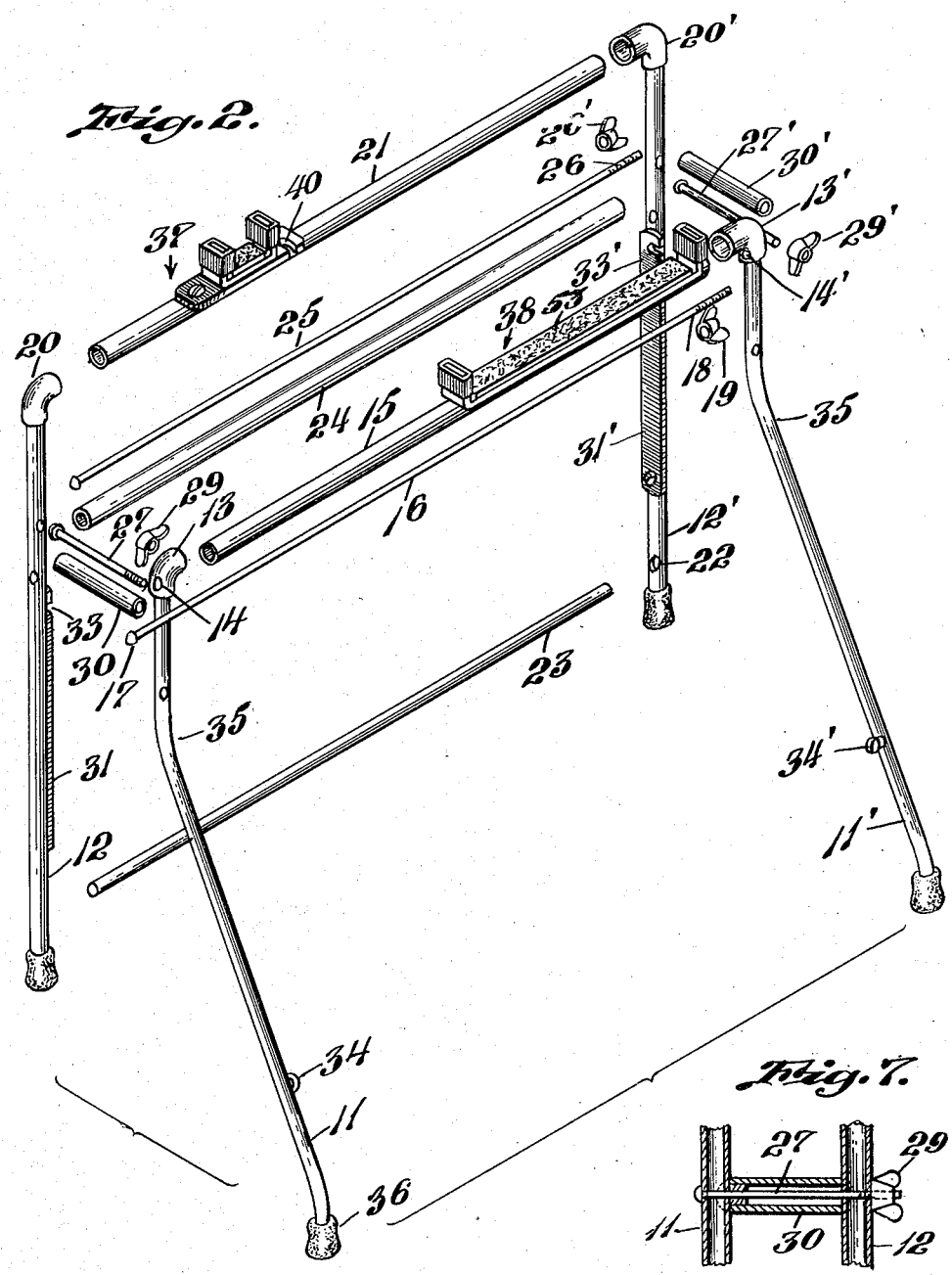

Patented May 1, 1951

2,550,793

UNITED STATES PATENT OFFICE 2,550,793

SUPPORT OR STAND

John Ferriera, Providence, R. I.

Application March 26, 1948, Serial No. 17,240

2 Claims. (Cl. 248—163)

This invention relates to a support or stand, particularly adapted for supporting a musical instrument.

Musical instruments such as a guitar are usually supported on the lap of the player. It is desirable to support such instruments other than in the lap so as to permit freer motion of the player.

The general objects of the invention are the provision of a support or stand particularly adapted for supporting a guitar or a like instrument which will be of a sturdy construction, readily assembled for use, adjustable for proper alignment, and readily dismantled for transportation.

With these and other objects in view, the invention consists of certain novel features of construction as will be more fully described and particularly pointed out in the appended claims.

In the accompanying drawings:

Figure 1 is a perspective view of a stand embodying the invention;

Figure 2 is a perspective view of the stand shown dismantled and showing the relative position of the parts thereof to each other;

Figure 3 is a top plan view of one end portion of the stand;

Figure 4 is a sectional view taken substantially along line 4—4 of Figure 3;

Figure 5 is a sectional view taken substantially along line 5—5 of Figure 1;

Figure 6 is a sectional view illustrating a connection between two adjacent elements;

Figure 7 is a sectional view taken substantially along lines 7—7 of Figure 1; and Figure 8 is a sectional view illustrating a manner of holding together two related parts for purpose of transportation.

The invention in general consists in providing a support or stand wherein the parts are arranged to be received one within the other and to be tied in assembled relation by means of tie rods engaged by wing nuts. When the stand is dismantled for transportation, related parts are arranged to be secured to each other in a manner so as to be readily accessible for assembly at the place of use of the stand. A clamping arrangement is provided for holding the instrument, and these clamping arrangements are secured to the stand in a fashion to be readily interchangeable for other clamping arrangements appropriated to the instrument on the stand.

Referring to the drawings for a more detailed description of the invention, 10 designates generally a support or stand which consists of four uprights providing front legs 11, 11' and rear legs 12, 12'. Each leg is made of similar tubing material which is circular in cross section; however, other forms may be employed, if desired. The front legs are each provided at their upper end with an elbow connection 13, 13' which is secured in position in any approved manner such as by welding. Each elbow has an opening 14, 14' (see Fig. 2). Tubular member 15 of a similar cross section as that of the legs extends horizontally lengthwise of the stand, and the end portions thereof are slidably received in the elbows 13, 13'. A tie rod 16 is provided with a head portion 17 and a threaded portion 18. This tie rod extends through opening 14 and through the opening 14' with the threaded portion thereof extending beyond the elbow 13' and is engaged by a wing nut 19 which detachably secures the front legs 11, 11' and horizontal member 15 together.

The rear legs 12, 12' are similarly provided at their upper end with elbows 20, 20', and a horizontal member 21 similar to the member 15 which has its end portions slidably received in the elbows 20, 20'. The lower end portion of the legs 12, 12' are provided each with an opening 22 aligned with each other which slidably receive therein the end portion of a round rod 23. An additional horizontal member 24 also made of tubular material also extends between the legs 12, 12' with the ends thereof abutting against the legs 12, 12'. A tie rod 25 having a threaded portion 26 extends through the legs 12, 12' and through the member 24. A wing nut 26' engages the threaded portion of the tie rod 25 to detachably secure the tie rod 25 in position.

The front legs 11, 11' and rear legs 12, 12' are secured to each other by means of tie rods 27 and 27' which extend through suitable openings in legs 11 and 12 and 11' and 12' and wing nut 29, 29' engages the threaded portion of the tie rods 27, 27'. A tubular spacer 30 is positioned between the legs 11 and 12 and a tubular spacer 30' is positioned between the legs 11' and 12'. The tie rods 27, 27' extend through these tubular spacers 30, 30'. The stand is further braced by means of straps 31, 31'. Each strap is pivotally secured to a rear leg 12, 12' as at 32, 32'. The opposite end of the strap is provided with a slotted opening 33, 33' in which is received the headed pins 34, 34' or the like fastened to the front legs 11, 11'. The front legs are bent outwardly as at 35 to provide a relatively large base to insure proper footing of the stand. The lower end of each leg is provided with a rubber or like material tip 36.

The stand is, in the present instance, made so as to support a guitar. To this end clamping members 37 and 38 are provided. The member 37 consists of a strap 39 which extends laterally across the members 15 and 21 and has one end thereof pivotally secured to the member 21 as at 39. The other end of the strap is provided with a bayonet opening 40, in which is received a pin or the like 41 fastened to the member 15. A U-shaped member 42 (see Fig. 5) is detachably secured to the strap 39 such as by means of cap screws 43 and provides spaced arms 44 between which is received the neck portion of the guitar. The base of the member 42 is covered with a strip 45 of felt or like material which is adhesively secured in place, and the arms 44 are covered with a tubular member 46 which is of a rubbery material whereby to protect the surface of the engaging portion of the guitar.

The member 38 is also of a U-shaped form providing a base portion 47 and arms 48, between which arms is received the body of the guitar. The member 38 also extends laterally across the members 15 and 21 and is pivotally secured to the member 15 as at 49 and has a key slot opening 50 in which is received pin or the like element 51 having an enlarged head portion 52. In order to protect the instrument, the base 47 is also covered with a strip 53 of a felt or like material which is adhesively secured to the base 47, and the arms 48 are each covered with a tubular member 54 also of a rubbery material.

The manner of assembling or taking the stand apart will be apparent from the drawing and the above description. When the stand is taken apart for transporting to the place of use the clamp member 37 on member 21 is moved to extend in the same general direction as the member 21. The clamp 38, straps 31 and 31' are also moved to extend in the general direction of the members to which they are secured. With the elements so related, the same may be easily carried in the carrying case of the musical instrument.

In order to assure the proper use of tie rod and tubular member with each other an apertured plug 55 is forced into one end of the members 24, 30, and 30'. Tie rod 25 and member 24 may then be secured to each other, as shown in Figure 8, and tie rods 27, 27' similarly attached to spacer member 30, 30'.

I claim:

1. A support or stand comprising a plurality of single tubular uprights providing a pair of front legs and a pair of rear legs, each of said legs having an elbow connection at the upper end thereof, a horizontal member extending between each pair of legs with the end portions of said members slidably received within said elbow connection, a tie rod extending through the elbow connection of the front legs and detachably secured in position, a plurality of braces extending lengthwise into engagement with the rear legs, one of said braces being tubular, a tie rod extending through said rear legs and through said tubular brace and detachably secured in place, laterally extending spacer tubular members between adjacent legs of each pair of legs, a tie rod extending through said adjacent legs and said lateral spacer members detachably secured in place, a strap pivotally secured to each of said rear legs and having a slotted opening therein, and a headed pin secured to each front leg and received within said slotted opening.

2. A support or stand as set forth in claim 1 wherein a plurality of clamping members are pivotally secured to said horizontal members.

JOHN FERRIERA.

REFERENCES CITED

The following references are of record in the file of this patent:

UNITED STATES PATENTS

| Number | Name | Date |
|---|---|---|
| 967,471 | Wanamaker | Aug. 16, 1910 |
| 1,219,220 | Banschbach | Mar. 13, 1917 |
| 1,230,819 | Gall | June 19, 1917 |
| 1,556,735 | Tiffany | Oct. 13, 1925 |